US012657786B2

(12) United States Patent (10) Patent No.: US 12,657,786 B2
Gupta et al. (45) Date of Patent: Jun. 16, 2026

(54) SYSTEM AND METHOD FOR EMPLOYING ADAPTIVE PIXEL SELECTOR TECHNIQUES FOR CALCULATING COLOR CONTRAST RATIO WITH DEAD PIXEL MITIGATION

(71) Applicant: BANK OF AMERICA CORPORATION, Charlotte, NC (US)

(72) Inventors: Kumar Gaurav Gupta, Gurugram (IN); Arun Kumar Sharma, Noida (IN); Saurabh Kumar, Gurugram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 154 days.

(21) Appl. No.: 18/505,833

(22) Filed: Nov. 9, 2023

(65) Prior Publication Data

US 2025/0157094 A1     May 15, 2025

(51) Int. Cl.
| | |
|---|---|
| *G06T 11/10* | (2026.01) |
| *G06T 7/00* | (2017.01) |
| *G06T 7/11* | (2017.01) |
| *G06T 7/90* | (2017.01) |
| *G09G 5/02* | (2006.01) |
| *G09G 5/04* | (2006.01) |

(Continued)

(52) U.S. Cl.
CPC ............ *G06T 11/10* (2026.01); *G06T 7/0006* (2013.01); *G06T 7/11* (2017.01); *G06T 7/90* (2017.01); *G06T 2200/24* (2013.01); *G06T 2207/30121* (2013.01)

(58) Field of Classification Search
CPC ..... G06T 11/001; G06T 11/40; G06T 7/0002; G06T 7/0006; G06T 7/11; G06T 7/90;

G06T 2207/30121; G06T 2207/30168; G06T 2200/24; G09G 5/06; G09G 2320/0271; G09G 2320/0276; G09G 2320/06; G09G 2320/0666; G09G 5/02–10; G09G 5/30; G06F 3/048; G06F 3/048482; H04N 1/58; H04N 1/60; H04N 5/57–58; H04N 9/64–78; G06K 9/40; G06V 20/69
See application file for complete search history.

(56) References Cited

U.S. PATENT DOCUMENTS

| | | | |
|---|---|---|---|
| 7,548,689 B2 | 6/2009 | Yap | |
| 8,977,073 B2 | 3/2015 | Kwon | |

(Continued)

*Primary Examiner* — Wesner Sajous
(74) *Attorney, Agent, or Firm* — Moore & Van Allen PLLC; Anoohya Yarlagadda

(57) ABSTRACT

Embodiments of the present invention provide a system for employing adaptive pixel selector techniques for calculating color contrast ratio with dead pixel mitigation. The system is configured for determining that a user is testing user interface accessibility compliance of at least one user interface associated with one or more applications, determining one or more rules associated with the user interface accessibility compliance of the one or more applications, selecting a pixel from the at least one user interface, determining that the pixel is not a defective pixel, calculating a color contrast ratio associated with the pixel, determining if the color contrast ratio is in compliance with the one or more rules, and displaying an output associated with determining if the color contrast ratio is in compliance with the one or more rules.

20 Claims, 7 Drawing Sheets

(51) Int. Cl.

| | | |
|---|---|---|
| *G09G 5/30* | (2006.01) | |
| *H04N 1/60* | (2006.01) | |
| *H04N 5/57* | (2006.01) | |
| *H04N 9/64* | (2023.01) | |

(56) References Cited

U.S. PATENT DOCUMENTS

| | | | | |
|---|---|---|---|---|
| 9,040,892 | B2 | 5/2015 | Smith | |
| 9,131,201 | B1 | 9/2015 | Geiss | |
| 10,708,525 | B2 | 7/2020 | Pourreza Shahri | |
| 10,944,914 | B1 | 3/2021 | Le | |
| 11,107,205 | B2 | 8/2021 | Hu | |
| 11,418,766 | B2 | 8/2022 | Zhen | |
| 11,455,516 | B2 | 9/2022 | Su | |
| 11,776,091 | B1 | 10/2023 | Molholm | |
| 11,995,800 | B2 | 5/2024 | Zhu | |
| 2008/0107343 | A1* | 5/2008 | Sanford | G06T 7/90 |
| | | | | 382/199 |
| 2015/0195464 | A1 | 7/2015 | Sharma | |
| 2015/0312503 | A1 | 10/2015 | Sato | |
| 2015/0348242 | A1 | 12/2015 | Molgaard | |
| 2017/0323148 | A1* | 11/2017 | Sarkar | G06T 7/0012 |
| 2018/0293710 | A1 | 10/2018 | Meyer | |
| 2019/0065886 | A1* | 2/2019 | Loui | G06F 16/5854 |
| 2022/0398987 | A1* | 12/2022 | Wyatt | G02B 5/208 |
| 2024/0037753 | A1* | 2/2024 | Milsom | G06V 10/46 |

* cited by examiner

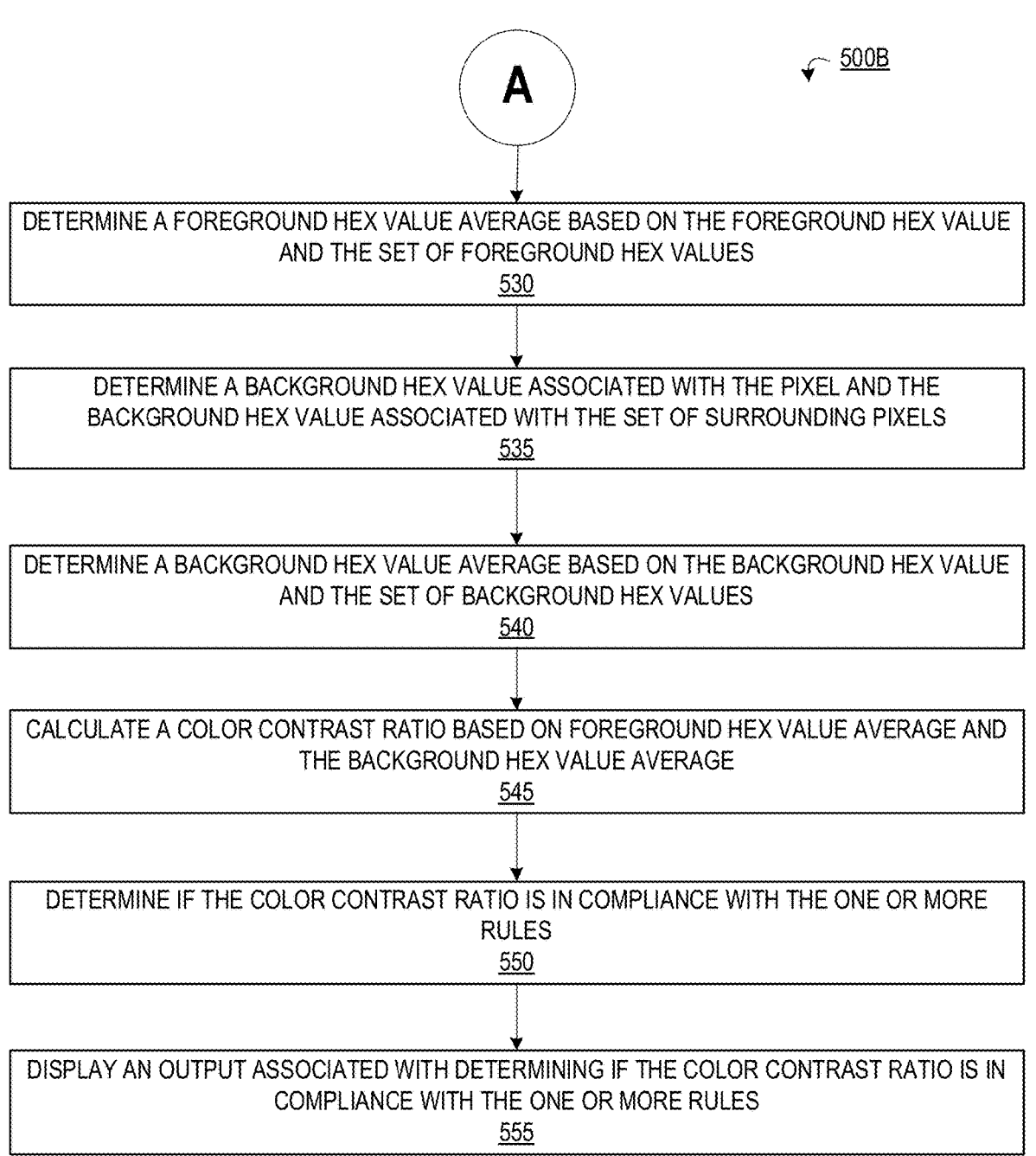

DETERMINE A FOREGROUND HEX VALUE AVERAGE BASED ON THE FOREGROUND HEX VALUE AND THE SET OF FOREGROUND HEX VALUES
530

DETERMINE A BACKGROUND HEX VALUE ASSOCIATED WITH THE PIXEL AND THE BACKGROUND HEX VALUE ASSOCIATED WITH THE SET OF SURROUNDING PIXELS
535

DETERMINE A BACKGROUND HEX VALUE AVERAGE BASED ON THE BACKGROUND HEX VALUE AND THE SET OF BACKGROUND HEX VALUES
540

CALCULATE A COLOR CONTRAST RATIO BASED ON FOREGROUND HEX VALUE AVERAGE AND THE BACKGROUND HEX VALUE AVERAGE
545

DETERMINE IF THE COLOR CONTRAST RATIO IS IN COMPLIANCE WITH THE ONE OR MORE RULES
550

DISPLAY AN OUTPUT ASSOCIATED WITH DETERMINING IF THE COLOR CONTRAST RATIO IS IN COMPLIANCE WITH THE ONE OR MORE RULES
555

FIG. 5B

SYSTEM AND METHOD FOR EMPLOYING ADAPTIVE PIXEL SELECTOR TECHNIQUES FOR CALCULATING COLOR CONTRAST RATIO WITH DEAD PIXEL MITIGATION

BACKGROUND

There exists a need for a system for employing adaptive pixel selector techniques for calculating color contrast ratio with dead pixel mitigation.

BRIEF SUMMARY

Embodiments of the present invention address the above needs and/or achieve other advantages by providing apparatuses (e.g., a system, computer program product and/or other devices) and methods for employing adaptive pixel selector techniques for calculating color contrast ratio with dead pixel mitigation. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user is testing user interface accessibility compliance of at least one user interface associated with one or more applications, determines one or more rules associated with the user interface accessibility compliance of the one or more applications, selects a pixel from the at least one user interface, determines that the pixel is not a defective pixel, calculates a color contrast ratio associated with the pixel, determines if the color contrast ratio is in compliance with the one or more rules, and displays an output associated with determining if the color contrast ratio is in compliance with the one or more rules.

In some embodiments, the present invention determines a set of surrounding pixels around the pixel, determines a foreground hex value associated with the pixel and a set of foreground hex values associated with the set of surrounding pixels, determines a foreground hex value average based on the foreground hex value and the set of foreground hex values, determines a background hex value associated with the pixel and the background hex value associated with the set of surrounding pixels, determines a background hex value average based on the background hex value and the set of background hex values.

In some embodiments, the present invention calculates the color contrast ratio based on the foreground hex value average and the background hex value average associated with the pixel.

In some embodiments, the present invention determines that the pixel is not a defective pixel based on determining that the foreground hex value and the set of foreground hex values are different.

In some embodiments, the present invention determines that the pixel is not a defective pixel based on determining that the background hex value and the set of background hex values are different.

In some embodiments, the present invention determines the one or more rules based on a location of usage of the one or more applications.

In some embodiments, the present invention determine the one or more rules based on a location of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
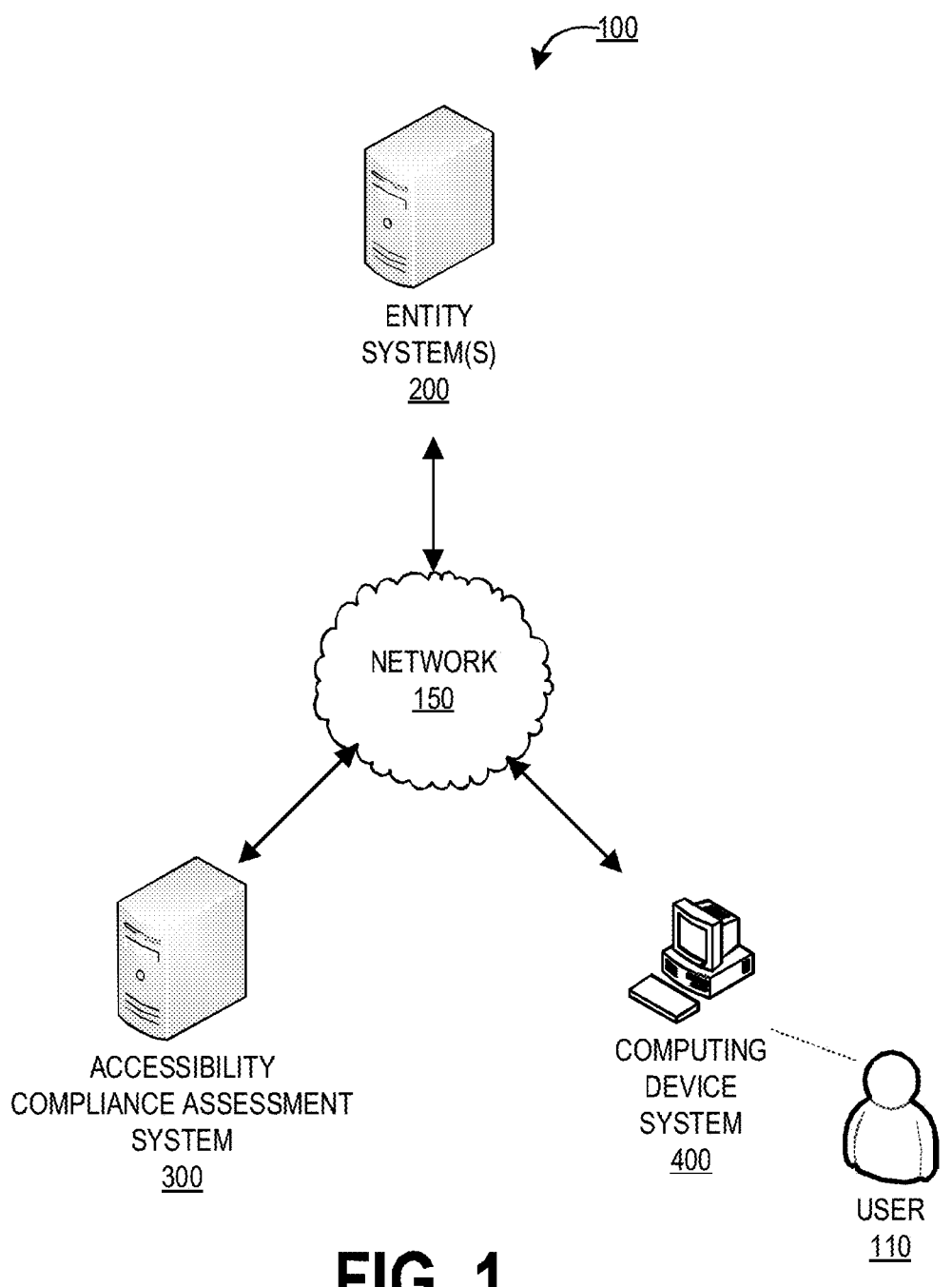
Figure 2:
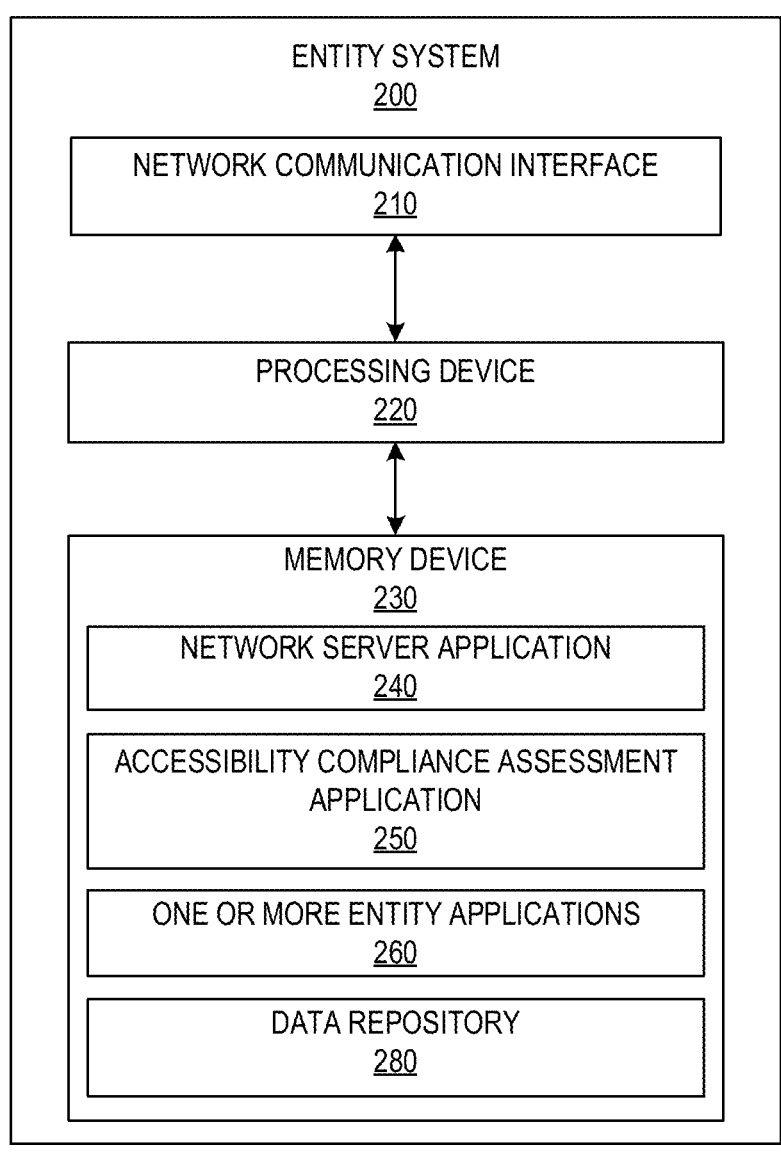
Figure 3:
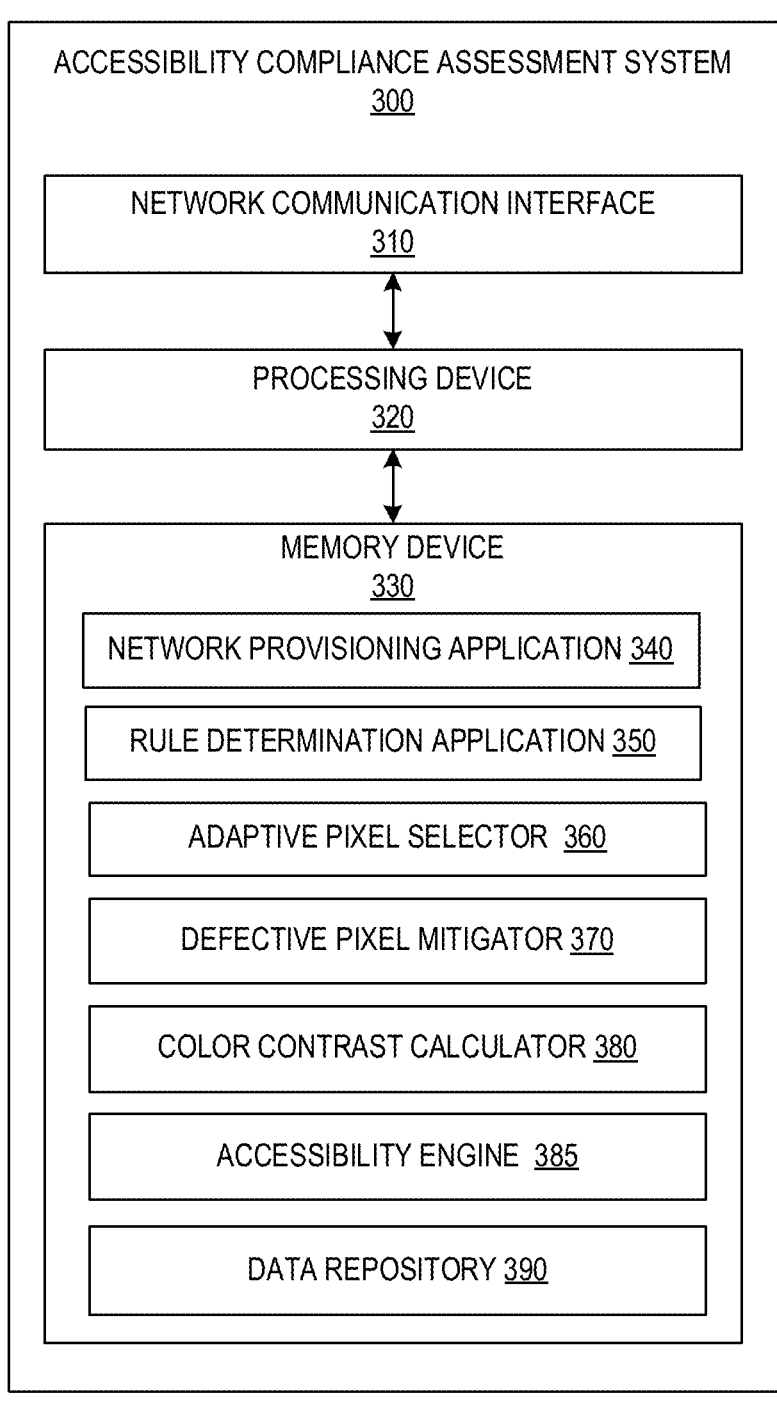
Figure 4:
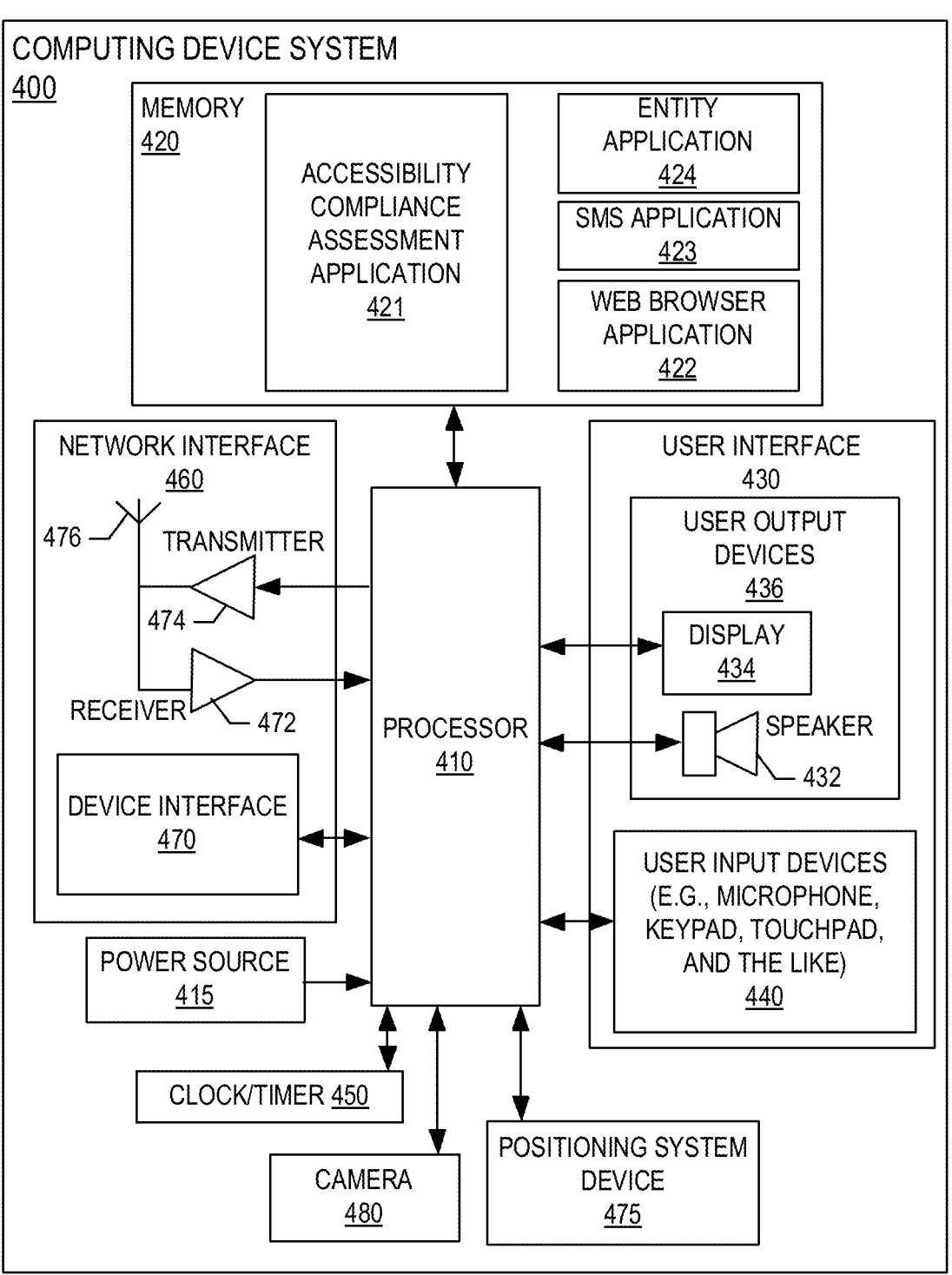
Figure 5A:
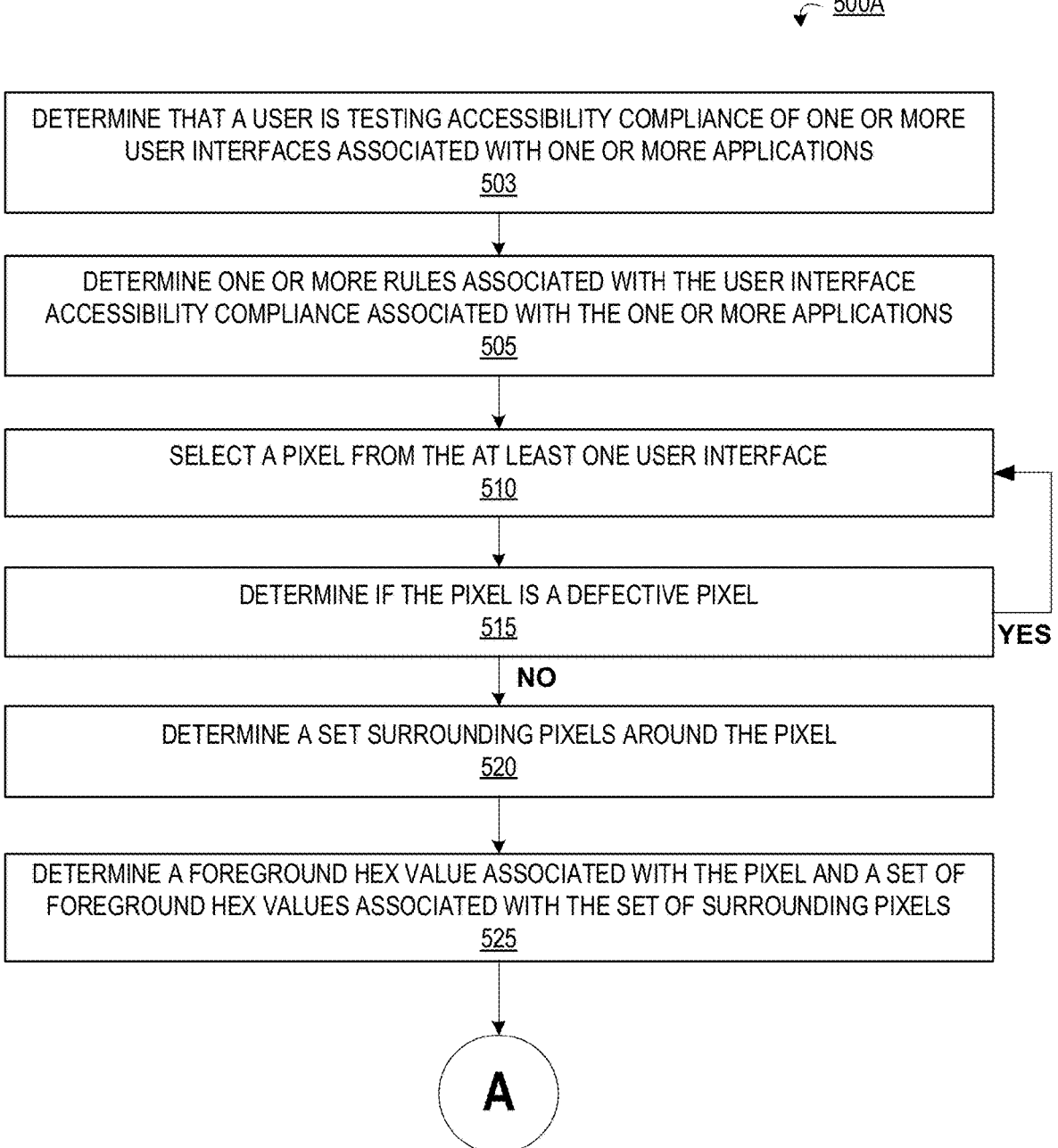
Figure 6:
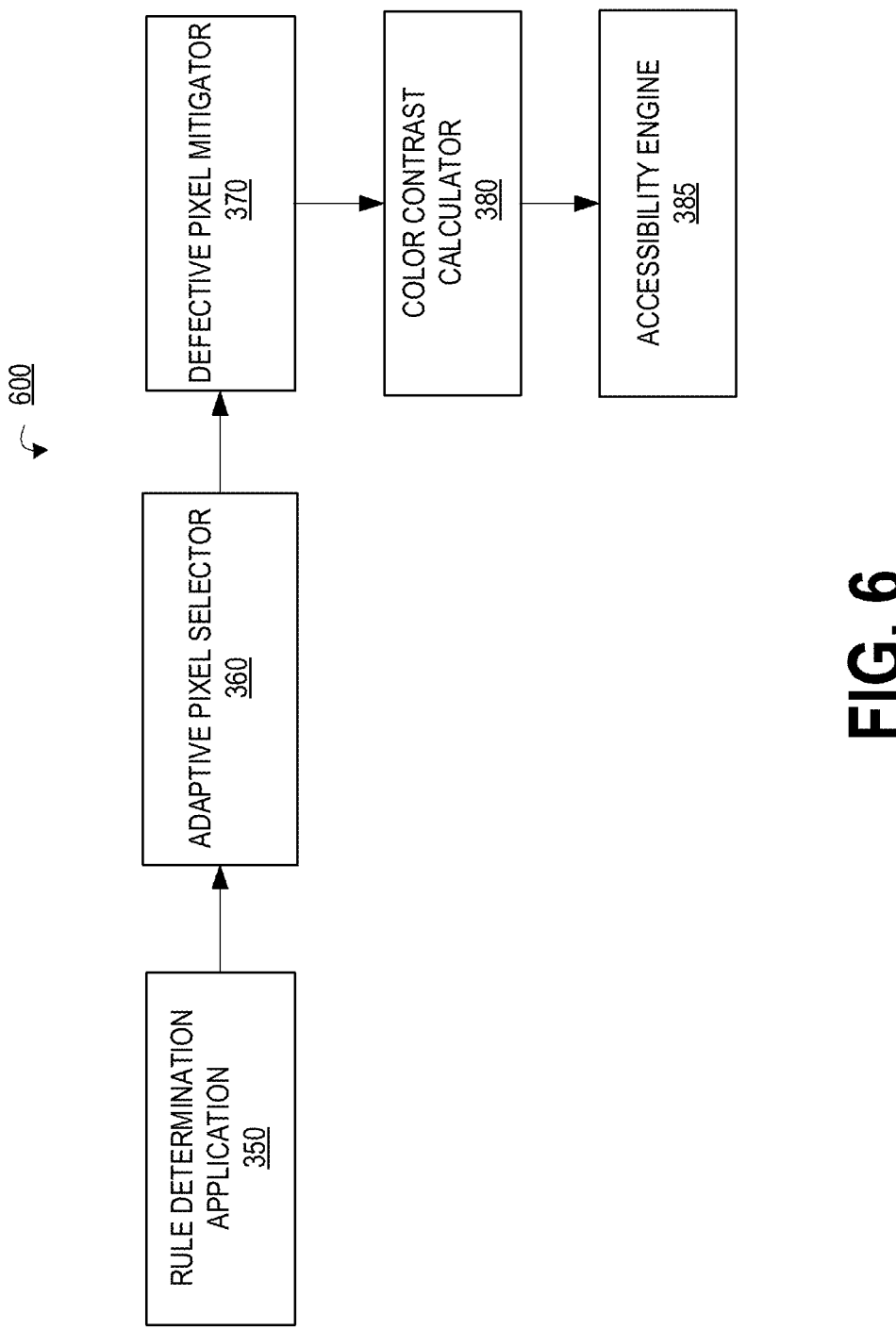

Having thus described embodiments of the invention in general terms, reference will now be made the accompanying drawings, wherein:

FIG. 1 provides a block diagram illustrating a system environment for employing adaptive pixel selector techniques for calculating color contrast ratio with dead pixel mitigation, in accordance with an embodiment of the invention;

FIG. 2 provides a block diagram illustrating the entity system 200 of FIG. 1, in accordance with an embodiment of the invention;

FIG. 3 provides a block diagram illustrating an accessibility compliance assessment system 300 of FIG. 1, in accordance with an embodiment of the invention;

FIG. 4 provides a block diagram illustrating the computing device system 400 of FIG. 1, in accordance with an embodiment of the invention;

FIGS. 5A and 5B provide a process flow for employing adaptive pixel selector techniques for calculating color contrast ratio with dead pixel mitigation, in accordance with an embodiment of the invention; and FIG. 6 provides a block diagram illustrating the process of employing adaptive pixel selector techniques for calculating color contrast ratio with dead pixel mitigation, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that creates, manages, develops, provides, and/or uses one or more applications (e.g., web applications, mobile applications, or the like) to perform one or more activities. In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Applications (e.g., web applications, mobile applications, or the like) created, managed, and/or used within an entity have to adhere to accessibility guidelines (e.g., Web Content Accessibility Guidelines (WCAG) 2.1 in the U.S., W3C Web Accessibility Initiative (WAI) in India, EN 301 549 in Europe, and/or the like) that are in place in every country. These guidelines comprise standards for color contrast ratios of user interface associated with the applications. Each entity has to perform testing of applications to check for accessibility compliance before allowing the end user to use the applications. However, while testing for accessibility compliance, mere calculation of color contrast ratio of a pixel directly on a user interface of the application may provide inaccurate results as the luminance of the color of the pixel is not taken into consideration. Furthermore, color of the pixel determined may not be accurate due to malfunctioning display screens, thereby resulting in inaccurate calculation of color contrast ratios. As such, there exists a need for a system that accurately tests for accessibility compliance associated with the applications of the entity.

FIG. 1 provides a block diagram illustrating a system environment 100 for employing adaptive pixel selector techniques for calculating color contrast ratio with dead pixel mitigation, in accordance with an embodiment of the invention. As illustrated in FIG. 1, the environment 100 includes an accessibility compliance assessment system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200. In some embodiments, the one or more user(s) 110 of the system environment 100 may be customers of the entity associated with the entity system 200. In some embodiments, the one or more user(s) 110 of the system environment 100 may be potential customers of the entity associated with the entity system 200.

The entity system(s) 200 may be any system owned or otherwise controlled by an entity to support or perform one or more process steps described herein. In some embodiments, the entity is a financial institution. In some embodiments, the entity is a non-financial institution.

The accessibility compliance assessment system 300 is a system of the present invention for performing one or more process steps described herein. In some embodiments, the accessibility compliance assessment system 300 may be an independent system. In some embodiments, the accessibility compliance assessment system 300 may be a part of the entity system 200.

The accessibility compliance assessment system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the accessibility compliance assessment system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the accessibility compliance assessment system 300 and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an accessibility compliance assessment application 250, one or more entity applications 260, and a data repository 280. The computer-executable program code of the network server application 240, the accessibility compliance assessment application 250, and the one or more entity applications 260 to perform certain logic, data-extraction, and data-storing functions of the entity system 200 described herein, as well as communication functions of the entity system 200.

The network server application 240, the accessibility compliance assessment application 250, and the one or more entity applications 260 are configured to store data in the data repository 280 or to use the data stored in the data repository 280 when communicating through the network communication interface 210 with the accessibility compliance assessment system 300, and the computing device system 400 to perform one or more process steps described herein. In some embodiments, the entity system 200 may receive instructions from the accessibility compliance assessment system 300 via the accessibility compliance assessment application 250 to perform certain operations. The accessibility compliance assessment application 250 may be provided by the accessibility compliance assessment system 300.

FIG. 3 provides a block diagram illustrating the accessibility compliance assessment system 300 in greater detail, in accordance with embodiments of the invention. As illustrated in FIG. 3, in one embodiment of the invention, the accessibility compliance assessment system 300 includes one or more processing devices 320 operatively coupled to a network communication interface 310 and a memory device 330. In certain embodiments, the accessibility compliance assessment system 300 is operated by an entity, such as a financial institution, while in other embodiments, the accessibility compliance assessment system 300 is operated by an entity other than a financial institution. In some embodiments, the accessibility compliance assessment system 300 is owned or operated by the entity of the entity system 200. In some embodiments, the accessibility compliance assessment system 300 may be an independent system. In alternate embodiments, the accessibility compliance assessment system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the accessibility compliance assessment system 300 described herein. For example, in one embodiment of the accessibility compliance assessment system 300, the memory device 330 includes, but is not limited to, a rule determination application 350, an adaptive pixel selector 360, a defective pixel mitigator 370, a color contrast calculator 380, an accessibility engine 385, and a data repository 390 comprising data processed or accessed by one or more applications in the memory device 330. The computer-executable program code of the network provisioning application 340, the rule determination application 350, the adaptive pixel selector 360, the defective pixel mitigator 370, the color contrast calculator 380, and the accessibility engine 385 may instruct the processing device 320 to perform certain logic, data-processing, and data-storing functions of the accessibility compliance assessment system 300 described herein, as well as communication functions of the accessibility compliance assessment system 300.

The network provisioning application 340, the rule determination application 350, the adaptive pixel selector 360, the defective pixel mitigator 370, the color contrast calculator 380, and the accessibility engine 385 are configured to invoke or use the data in the data repository 390 when communicating through the network communication interface 310 with the entity system 200, and the computing device system 400. In some embodiments, the network provisioning application 340, the rule determination application 350, the adaptive pixel selector 360, the defective pixel mitigator 370, the color contrast calculator 380, and the accessibility engine 385 may store the data extracted or received from the entity system 200 and the computing device system 400 in the data repository 390. In some embodiments, the network provisioning application 340, the rule determination application 350, the adaptive pixel selector 360, the defective pixel mitigator 370, the color contrast calculator 380, and the accessibility engine 385 may be a part of a single application. One or more processes performed by the network provisioning application 340, rule determination application 350, the adaptive pixel selector 360, the defective pixel mitigator 370, the color contrast calculator 380, and the accessibility engine 385 are described in FIGS. 5 and 6.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an accessibility compliance assessment application 421, an entity application 424, or the like. These applications also typically instructions to a graphical user interface (GUI) on the display 430 that allows the user 110 to interact with the entity system 200, the accessibility compliance assessment system 300, and/or other devices or systems. The memory 420 of the computing device system 400 may comprise a Short Message Service (SMS) application 423 configured to send, receive, and store data, information, communications, alerts, and the like via the wireless network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIGS. 5A and 5B provide a process flow for employing adaptive pixel selector techniques for calculating color contrast ratio with dead pixel mitigation, in accordance with an embodiment of the invention. As shown in block 503, the system determines that a user is testing accessibility compliance of one or more user interfaces associated with one or more applications. The user may be an employee of the entity (e.g., application developer, application tester, software engineer, or the like). The one or more applications may be any applications that are associated with the entity. For example, the user may initiate testing of an application that is being developed by the entity via a user device (e.g., computing device system 400).

As shown in block 505, the system determines one or more rules associated with the user interface accessibility compliance associated with the one or more applications. In some embodiments, the system may extract accessibility guidelines from one or more third party systems (e.g., third party websites) and may analyze the accessibility guidelines to determine the one or more rules. For example, the system may extract accessibility guidelines and may determine a rule that color contrast ratio associated with user interfaces of applications must meet a standard of at least 4.5:1. It should be understood that there may be 'n' number of guidelines and the process flow provided by the system of the invention may be applied to other accessibility guidelines.

In one embodiment, the system may determine the one or more rules based on determining a location of the user that initiated compliance testing of the one or more applications. For example, the system may determine that the location of the user that initiated compliance testing is Country 'X' and may instantaneously determine the one or more rules associated with the user interface accessibility compliance testing based on accessibility guidelines that are set for Country 'X'. In another embodiment, the system may determine the one or more rules based on determining a location of usage associated with the one or more applications. For example, the system may determine that the application that is being tested is going to be used in Country 'X' and Country 'Y' and the system may determine rules associated with the Country 'X' and Country 'Y.'

As shown in block 510, the system selects a pixel from the at least one user interface. In one embodiment, the system may randomly select a pixel. In some embodiments, the system may receive an input from the user associated with the selection of the pixel. In some embodiments, the system may selectively choose a pixel from the user interface.

As shown in block 515, the system determines if the pixel is a defective pixel. If the system determines that the pixel is a defective pixel, the process flow is reverted back to block 510, where the selection process is repeated until the pixel that is selected is not defective. Defective pixels may comprise dead pixels, stuck pixels, hot pixels, or the like and may be caused by manufacturing defects, damage while usage of the display screens, or the like. Dead pixels may be pixels that are permanently damaged pixels that do not receive any power, which often result in black spots on the display screen of the user device that is being used for testing the one or more applications. Stuck pixels may be pixels that always receive power, which result in colored pixels that show up in same spots on the display screen and may be red, green, blue or any combination of these colors. Hot pixels may be pixels that only show up when the display sensors get hot during long exposures. In some embodiments, the system checks if the selected pixel in block 510 is a dead pixel, stuck pixel, or a hot pixel. The system may determine whether the selected pixel is a defective pixel or not based on determining a color of the pixel matches or is similar to the color of the surrounding pixels. For example, if the color of the selected pixel is black and the color of surrounding pixels is in the blue palette, the system may determine that the pixel is defective. In another example, the system may determine that the color of the selected pixel is green and the color of the surrounding pixels is in the red palette, the system may determine that the selected pixel is defective.

If the system determines that the pixel is not a defective pixel, the process flow proceeds to block 520. The system, instead of simply relying on one pixel to calculate the color contrast ratio, which may result in inaccurate color contrast ratio calculation for testing accessibility compliance, takes into consideration the colors of the surrounding pixels and luminance of the surrounding pixels as discussed in detail below. As shown in block 520, the system determines a set surrounding pixels around the pixel. The system may determine edge of the pixel to determine the set of surrounding pixels. In some embodiments, the system may employ Canny edge detector to detect edges of the selected pixel, where the process to detect edges of the selected pixel using Canny edge detector may comprise applying Gaussian filter to smooth a pixel in order to remove noise, finding the intensity gradients of the pixel, applying gradient magnitude thresholding or lower bound cut-off suppression to get rid of spurious response to edge detection, applying double threshold to determine potential edges, and tracking edge by hysteresis to finalize the detection of edges by suppressing all the other edges that are weak and not connected to strong edges.

Typically, all edge detection results are easily affected by the noise in and around the selected pixel and it is essential to filter out the noise to prevent false detection caused by it. To smooth the pixel, a Gaussian filter kernel is convolved with the pixel to slightly smooth the pixel to reduce the effects of obvious noise on the edge detector. To find out intensity gradient, Canny edge detector uses four filters to detect horizontal, vertical and diagonal edges in the pixel as the edge in a pixel may point in a variety of directions. Applying gradient magnitude thresholding or lower bound cut-off suppression, Canny edge detector compares the edge strength of the pixel with the edge strength of the pixel in the positive and negative gradient directions and if the edge strength of the pixel is the largest compared to the other pixels in the mask with the same direction (e.g., a pixel that is pointing in the y-direction will be compared to the pixel above and below it in the vertical axis), the value will be preserved. Otherwise, the value will be suppressed.

After application of non-maximum suppression, the remaining edge pixels provide a more accurate representation of real edges. However, some edge pixels remain that are caused by noise and color variation. To account for these spurious responses, edge pixels with a weak gradient value and preserve edge pixels with a high gradient value are filtered out. This is accomplished by selecting high and low threshold values. If an edge pixel's gradient value is higher than the high threshold value, it is marked as a strong edge pixel. If an edge pixel's gradient value is smaller than the high threshold value and larger than the low threshold value, it is marked as a weak edge pixel. If an edge pixel's gradient value is smaller than the low threshold value, it will be suppressed. The two threshold values are empirically determined and their definition will depend on the content of a given input.

The strong edge pixels should certainly be involved in the final edge image, but weak edge pixels may or may not be included. Canny edge detector determines whether these pixels come from a true edge, or noise/color variations. Weak edge pixels are dropped from consideration if it is the latter. Canny edge detector uses the idea that weak edge pixels from true edges are usually connected to a strong edge pixel while noise responses are unconnected. To track the edge connection, blob analysis is applied by looking at a weak edge pixel and its 8-connected neighborhood pixels. As long as there is one strong edge pixel that is involved in the blob, that weak edge point can be identified as one that should be preserved. These weak edge pixels become strong edges that can then cause their neighboring weak edge pixels to be preserved. Based on one or more steps performed by the Canny edge detector, the edges are determined and set of surrounding pixels are identified based on the edges.

As shown in block 525, the system determines a foreground hex value associated with the pixel and a set of foreground hex values associated with the set of surrounding pixels. In some embodiments, the system may determine foreground hex values associated with the pixel and the set of surrounding pixels based on analyzing a software program code associated with the user interface of the application. In some embodiments, the system may determine comprise a color detector tool to instantly determine the foreground hex values associated with the pixel and the set of surrounding pixels.

As shown in block 530, the system determines a foreground hex value average based on the foreground hex value and the set of foreground hex values. The system may determine the arithmetic mean of the foreground hex value of the pixel and the set of foreground hex values associated with the set of surrounding pixels.

As shown in block 535, the system determines a background hex value associated with the pixel and the background hex value associated with the set of surrounding pixels. In some embodiments, the system may determine background hex values associated with the pixel and the set of surrounding pixels based on analyzing the software program code associated with the user interface of the application. In some embodiments, the system may determine comprise the color detector tool to instantly determine the background hex values associated with the pixel and the set of surrounding pixels.

As shown in block 540, the system determines a background hex value average based on the background hex value and the set of background hex values. The system may determine the arithmetic mean of the background hex value of the pixel and the set of background hex values associated with the set of surrounding pixels.

As shown in block 545, the system calculates a color contrast ratio based on foreground hex value average and the background hex value average. The system may determine the ratio of the foreground hex value average and the background hex value average to calculate the color contrast ratio.

As shown in block 550, the system determines if the color contrast ratio is in compliance with the one or more rules. For example, the system may check of the color contrast ratio calculated in block 545 meets the rules associated with the color contrast ratio standards set in the accessibility guidelines.

As shown in block 555, the system display an output associated with determining if the color contrast ratio is in compliance with the one or more rules. In some embodiments, the system may further comprise a machine learning model that provides one or more recommendations associated with correction of the colors for correcting the color contrast ratio to meet the one or more rules associated with the accessibility guidelines.

FIG. 6 provides a block diagram illustrating the process of employing adaptive pixel selector techniques for calculating color contrast ratio with dead pixel mitigation, in accordance with an embodiment of the invention. As shown, the rule determination application 350 analyzes the rules associated with the user interface accessibility guidelines and passes onto the adaptive pixel selector 360, where a pixel is selected from the one or more pixels on the user interface of an application that the user is testing. The adaptive pixel selector 360 then determines whether the selected pixel is a defective pixel or not. If the selected pixel is a defective pixel, the defective pixel mitigator 370 selects another pixel that is not defective. This is process is repeated by the adaptive pixel selector 360 and the defective pixel mitigator 370 until the pixel that is selected is not defective. The color contrast calculator 380 then calculates the color contrast ratio based on background hex values and foreground hex values associated with the selected pixel and surrounding pixels around the selected pixel. The accessibility engine 385 then verifies whether the calculated contrast ratio complies with the rules determined by the rule determination engine. The accessibility engine 385 may perform one or more steps to correct the color contrast ratio to comply with the rules.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for employing adaptive pixel selector techniques for calculating color contrast ratio with dead pixel mitigation, comprising:
   at least one processing device;
   at least one memory device; and
   a module stored in the at least one memory device comprising executable instructions that when executed by the at least one processing device, cause the at least one processing device to:
      determine that a user is testing user interface accessibility compliance of at least one user interface associated with one or more applications;
      determine one or more rules associated with the user interface accessibility compliance of the one or more applications;
      select a pixel from the at least one user interface for calculating a color contrast ratio;
      determine that the pixel being used for calculating the color contrast ratio is not defective to mitigate influence of defective pixels on calculation of the color contrast ratio;
      calculate the color contrast ratio associated with the pixel;
      determine if the color contrast ratio is in compliance with the one or more rules; and
      display an output associated with whether the color contrast ratio is in compliance with the one or more rules to the user testing the user interface accessibility compliance of the at least one user interface associated with the one or more applications.

2. The system according to claim 1, wherein the executable instructions cause the at least one processing device to:
   determine a set of surrounding pixels around the pixel;
   determine a foreground hex value associated with the pixel and a set of foreground hex values associated with the set of surrounding pixels;
   determine a foreground hex value average based on the foreground hex value and the set of foreground hex values;
   determine a background hex value associated with the pixel and a set of background hex values associated with the set of surrounding pixels; and
   determine a background hex value average based on the background hex value and the set of background hex values.

3. The system according to claim 2, wherein the executable instructions cause the at least one processing device to calculate the color contrast ratio based on the foreground hex value average and the background hex value average associated with the pixel.

4. The system according to claim 2, wherein the executable instructions cause the at least one processing device to determine that the pixel is not defective based on determining that the foreground hex value and the set of foreground hex values are different.

5. The system according to claim 2, wherein the executable instructions cause the at least one processing device to determine that the pixel is not defective based on determining that the background hex value and the set of background hex values are different.

6. The system according to claim 1, wherein the executable instructions cause the at least one processing device to determine the one or more rules based on a location of usage of the one or more applications.

7. The system according to claim 1, wherein the executable instructions cause the at least one processing device to determine the one or more rules based on a location of the user.

8. A computer program product for employing adaptive pixel selector techniques for calculating color contrast ratio with dead pixel mitigation, comprising a non-transitory computer-readable storage medium having computer-executable instructions that when executed by the computer causing the computer to perform steps for:

determining that a user is testing user interface accessibility compliance of at least one user interface associated with one or more applications;

determining one or more rules associated with the user interface accessibility compliance of the one or more applications;

selecting a pixel from the at least one user interface for calculating a color contrast ratio;

determining that the pixel being used for calculating the color contrast ratio is not defective to mitigate influence of defective pixels on calculation of the color contrast ratio;

calculating the color contrast ratio associated with the pixel;

determining if the color contrast ratio is in compliance with the one or more rules; and displaying an output associated with whether the color contrast ratio is in compliance with the one or more rules to the user testing the user interface accessibility compliance of the at least one user interface associated with the one or more applications.

9. The computer program product according to claim 8, wherein the non-transitory computer-readable storage medium comprises computer-executable instructions for:

determining a set of surrounding pixels around the pixel;

determining a foreground hex value associated with the pixel and a set of foreground hex values associated with the set of surrounding pixels;

determining a foreground hex value average based on the foreground hex value and the set of foreground hex values;

determining a background hex value associated with the pixel and a set of background hex values associated with the set of surrounding pixels; and determining a background hex value average based on the background hex value and the set of background hex values.

10. The computer program product according to claim 9, wherein the non-transitory computer-readable storage medium comprises computer-executable instructions for calculating the color contrast ratio based on the foreground hex value average and the background hex value average associated with the pixel.

11. The computer program product according to claim 9, wherein the non-transitory computer-readable storage medium comprises computer-executable instructions for determining that the pixel is not defective based on determining that the foreground hex value and the set of foreground hex values are different.

12. The computer program product according to claim 9, wherein the non-transitory computer-readable storage medium comprises computer-executable instructions for determining that the pixel is not defective based on determining that the background hex value and the set of background hex values are different.

13. The computer program product according to claim 8, wherein the non-transitory computer-readable storage medium comprises computer-executable instructions for determining the one or more rules based on a location of usage of the one or more applications.

14. The computer program product according to claim 8, wherein the non-transitory computer-readable storage medium comprises computer-executable instructions for determining the one or more rules based on a location of the user.

15. A computerized method for employing adaptive pixel selector techniques for calculating color contrast ratio with dead pixel mitigation, the method comprising:

determining that a user is testing user interface accessibility compliance of at least one user interface associated with one or more applications;

determining one or more rules associated with the user interface accessibility compliance of the one or more applications;

selecting a pixel from the at least one user interface for calculating a color contrast ratio;

determining that the pixel being used for calculating the color contrast ratio is not defective to mitigate influence of defective pixels on calculation of the color contrast ratio;

calculating the color contrast ratio associated with the pixel;

determining if the color contrast ratio is in compliance with the one or more rules; and displaying an output associated with whether the color contrast ratio is in compliance with the one or more rules to the user testing the user interface accessibility compliance of the at least one user interface associated with the one or more applications.

16. The computerized method according to claim 15, wherein the method comprises determining a set of surrounding pixels around the pixel;

determining a foreground hex value associated with the pixel and a set of foreground hex values associated with the set of surrounding pixels;

determining a foreground hex value average based on the foreground hex value and the set of foreground hex values;

determining a background hex value associated with the pixel and a set of background hex values associated with the set of surrounding pixels; and determining a background hex value average based on the background hex value and the set of background hex values.

17. The computerized method according to claim 16, wherein the method comprises calculating the color contrast ratio based on the foreground hex value average and the background hex value average associated with the pixel.

18. The computerized method according to claim 16, wherein the method comprises determining that the pixel is not defective based on determining that the foreground hex value and the set of foreground hex values are different.

19. The computerized method according to claim 16, wherein the method comprises determining that the pixel is not defective based on determining that the background hex value and the set of background hex values are different.

20. The computerized method according to claim 15, wherein the method comprises determining the one or more rules based on a location of usage of the one or more applications.

\*   \*   \*   \*   \*